United States Patent Office
2,844,610
Patented July 22, 1958

2,844,610
PURIFICATION OF ACYLAMINO CARBOXYLIC ACIDS

Werner Freudenberg, Camp Hill, Pa., assignor to General Aniline & Film Corporation, New York, N. Y., a corporation of Delaware No Drawing. Application July 2, 1956
Serial No. 595,110

4 Claims. (Cl. 260—404)

The invention here presented is a new and useful procedure for the purification of acylated amino and imino compounds as produced by the Schotten-Baumann reaction in which the product is treated with a lower alkanol, preferably somewhat dilute, to effect a precipitation separation between the desired compound and the impurities.

The Schotten-Baumann reaction is highly useful as a means for the acylation of amino and imino compounds by the reaction therewith of an acyl halide in the presence of a dilute alkali solution; the reaction being well known, and very valuable. However the reaction never gives the desired product in 100% yield, but there are always side reactions which result in the alkali metal salt of the acyl halide, and many other impurities and by-products which are highly undesirable in the principal product and in addition, have been in the past difficult to remove. Also, even though the reaction is conducted in the presence of a lower alkanol as shown in the copending application Ser. No. 595,140, filed on even date herewith, there are still small amounts of impurities which are objectionable and difficult to remove.

The reactions involved may be shown graphically by the following equations:

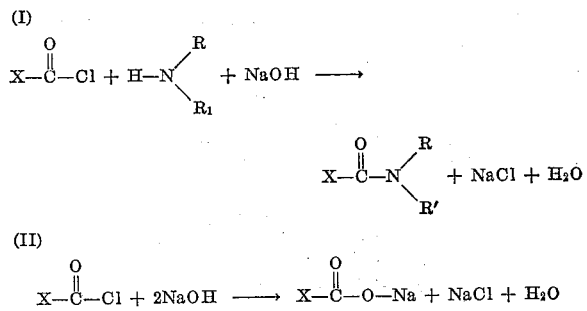

in which X represents an organic radical and R and R' represent aliphatic radicals.

The invention here presented is a simple, useful and wholly unexpected procedure for separating the products of Reaction II above, from the desired product as shown in Reaction I, to effect a very important purification of the desired compound.

The importance of the present invention lies essentially in the addition of a substantial amount of a lower alkanol to the reaction mixture containing the products of Reactions I and II as above set out, by which the sodium salt derived from the acylhalide is precipitated, leaving the desired acylated amino or imino compound in solution. The purification is based upon the fact that in this solution, when the alcohol content is raised to a sufficiently high value, the acylated amino or imino compound remains soluble, even in an alcohol solution containing from 35% to 60% of alcohol, whereas in this solution, the impurities precipitated promptly and in excellently filterable condition. The preferred alkanol is necessarily water-soluble and is preferably methyl, ethyl, propyl or butyl alcohol. However any water-soluble alcohol is usable either alone or in combination with some of the other alcohols.

In practising the invention a mixture is prepared of the desired amino or imino compound, in solution in water; to which there is then added an appropriate amount of alkali metal hydroxide and then the fatty acid halide. The mixture is maintained during the entire reaction at a pH preferably above 9.5 and the temperature is controlled by cooling to keep it below about 50° C. At the close of the reaction there is then added a substantial amount of the lower alcohol to precipitate the impurities.

The following discussion will show the character of the reaction, and the difficulties encountered in it.

This example describes a typical Schotten-Baumann reaction, the condensation of sarcosine with oleic acid chloride as practised commonly on a commercial scale.

89 pts. of pure sarcosine, in the form of a 15% solution of the sodium salt, are charged to the reactor, and 200 pts. of 33% caustic soda are then added, followed by 300 pts. of oleyl chloride, having a purity of 97%. During the reaction, it is necessary to insure that the mixture continues to show a pH preferably above 9.5. When the addition is completed, stirring is continued for a half hour at 50°. The mixture is then neutralized with about 40 pts. 20° Bé. hydrochloric acid.

Sodium oleyl sarcosinate is formed in a yield of about 70% of theory and is contaminated by sodium oleate, sodium chloride, unreacted sarcosine and minor amounts of other by-products, which are difficult to separate and represent a serious loss of valuable material.

Many factors influence the course of this reaction such as concentration of the reactants, temperature, type and rate of agitation and maintenance of a definite pH range. The nature of the hydrogen halide acceptor also effects the course and rate of reaction.

The reaction is most commonly carried out by adding the acyl halide slowly to the alkaline solution of the base.

The order of addition has in rare cases been reversed and the alkali added to the mixture of the base and the acyl halide. Obviously this is possible only when the acyl halide does not react at an appreciable rate with the base and especially with the aqueous medium. For practical purposes it may be noted, that the base is in solution or in suspension in an aqueous phase as the alkali salt, and the fatty acid halide is added over a period of time. Additional hydrogen halide acceptor is added as the reaction between fatty acid halide and the amino or imino group progresses. Incomplete condensation is known to occur when the amino group in itself acts as hydrogen halide acceptor, with formation of amine hydro halide, thus blocking continued condensation. Complete reaction is indicated when no further quantities of hydrogen halide are formed or when the pH of the condensation mass remains constant.

Thus a serious disadvantage of the Schotten-Baumann reaction is the fact that quantitative yields of N-acyl-amino compounds are never obtained. Formation of the alkali salts of the acid derived from the acyl halide by hydrolysis is always observed and, when employing the halides of fatty acids, sodium salts of fatty acids are obtained as side products. A further source for occurrence of fatty acid salts or soaps in the condensation product is due to the fact that technical grades of fatty acid chloride invariably contain varying amounts of fatty acid per se which result from incomplete conversion of the free fatty acid to the acid halide. It is furthermore known that even distilled fatty acid halides retain free fatty acid due to entrainment and hydrolysis during distillation.

It is now found that all of these impurities, and various other impurities, present usually only in traces, and of uncertain character, are readily precipitated by the addition to the reaction mixture of a substantial amount of the water-soluble lower alkanol, whereupon these impurities are thrown down in the form of easily filterable crystals.

The fatty acylamino compounds produced by my invention are widely used as detergents, wetting, fulling, foaming and leveling agents in the textile, rubber and paper industries. The cosmetic industry also depends on these compounds, for instance as anti-enzymatic additives to dentifrices and as emulsifiers for lotions and creams.

Contamination of these products with salts of fatty acids constitutes a serious economic disadvantage for the producer of these chemicals, since the yield of desired condensation product decreases proportionally with every mole fraction of soap formed as a by-product. Admixed soaps also greatly alter the properties of the finished goods. This is especially true when the fatty acylamino compounds are to be prepared in pure form for the cosmetic and food industry. As has been pointed out, fatty acyl amino carboxylic acids should contain a minimum of free fatty acid or soap for maximum activity and lasting effect and in order to avoid the characteristic biting taste and unpleasant odor of soaps which cannot satisfactorily be masked by flavoring agents. Although it is well known that fatty acids and soaps can be eliminated by crystallization from organic solvents, this method is expensive, time consuming, wasteful, and often objectionable due to the hazards involved in handling flammable solvents on a large scale.

Thus the process of the invention is an improved method for purifying compounds resulting from the acylation via an acid chloride of amino and imino compounds by the addition to the reaction mixture of substantial quantities of a water-soluble lower alkanol. Other objects and details of the invention will be apparent from the following description.

The following examples show the addition of a water-soluble lower alkanol to the material at the end of the reaction to precipitate the impurities and they are offered to illustrate the invention but not to limit the scope of the claims.

Example 1

4500 lbs. of a 13% solution of sarcosine=565 lbs. 100% or 6.35 moles is charged into a kettle constructed of stainless steel, 4100 lbs. of water is then added to lower the sarcosine concentration to 6.5%. There is then added at 25–35° C., in the course of 6 hours, 1430 lbs. lauric acid chloride. Brine cooling is required to control the reaction. While the addition of the acid chloride proceeds, 650 lbs. of 50% sodium hydroxide solution is added in three equal portions at the end of the first, second and third hour. The solution must at all times during the condensation remain at a pH above 9.5. When the addition is complete the mixture is allowed to stir for an additional hour. A sample is then taken which is analyzed for free lauric acid and for lauroyl sarcosine. At the end of the additional hour of stirring when the reaction is complete, there is added to the reaction mixture, 730 lbs. of denatured ethyl alcohol. The major portion of the impurities are precipitated in filterable condition yielding an acylated sarcosine of high purity, higher than obtainable in any other procedure.

It will be noted that the precipitating alcohol functions as an environment rather than as a reactant and little or none of the alcohol combines with either the precipitate or the solute. Accordingly it is recoverable almost in toto. For this procedure it is desirable that the reaction mixture should be approximately neutral since it is least subject to heat influence at neutrality; and the alcohol may then be distilled out. It is of course essential that the precipitated impurities be filtered out before the distillation step. Some alcohol is usually adsorbed into the precipitate, and this may be recovered by gentle heating of the precipitate, under a good vacuum, under which conditions much of the adsorbed alcohol can be recovered. From the solute, the alcohol is more easily recoverable, although again there is some tendency toward adsorption of alcohol into the purified reaction product, and this portion is sometimes recoverable only with difficulty. However, usually from 90% to 98% of the alcohol used is recoverable.

Example 2

Into a stainless steel clad kettle was charged 7000 lbs. water, 7500 lbs. sarcosine solution of 13% strength (as free acid, M. W.=89) with temperature adjusted at 35–40° C., 2300 lbs. of lauroyl chloride and 1100 lbs. 50% caustic were then added simultaneously during 8 hrs., keeping the mixture just alkaline to triazine paper during the addition. At the end of this step, the mixture analyzed 13.6% sodium lauroyl sarcosinate, 1.23% sodium laurate or, on the 100% active basis, the sodium laurate was $$\left(\frac{1.23}{13.6}\right) 9.05\%$$

To the reaction mixture in the kettle was added 3000 lbs. of ethanol and the pH was adjusted to 5.4 with hydrochloric acid. The mixture was then cooled to 5–10° C. and held at this point for 2 hours. A considerable amount of flaky shiny crystals was formed during this period. The crystals were removed by filtration leaving a clear filtrate analyzing as follows: 11.0% sodium lauroyl sarcosinate, a 3% sodium laurate or, on the 100% active basis, the sodium laurate was $$\left(\frac{.3}{11.0}\right) 2.7\%$$

It is seen, therefore, that the ratio of sodium laurate to sodium lauroyl sarcosinate was brought from 9.5% to 2.7%. In many other laboratory and plant scale examples, this ratio has been reduced from 5–17% to 2–3%.

Thus the process of the invention adds to the reaction mixture of fatty acid halide, amino or imino compound and alkali, from 5–50% of water-soluble lower alkanol to precipitate the fatty acid impurities from the reaction mixture.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. Process for the production of fatty acylamino compounds in high yield and in pure form, which comprises reacting an amine with a fatty acid halide in the presence of an alkali metal hydroxide in dilute solution at a pH above 9.5 and at a temperature below about 50° C. whereby there is formed the acylamino compound and, as contaminants, alkali metal salts of the fatty acid, alkali metal halide, unreacted amine and minor amounts of other by-products, and at the completion of the reaction adding to the reaction mixture from 5% to 50% by weight of a water-soluble lower alkanol and lowering the pH of the reaction mixture so as to cause the said contaminants promptly to precipitate out in excellent filterable condition and the acylamino compound to go into solution in aqueous lower alkanol, and then distilling off the alkanol and water from said aqueous solution of acylamino compound to obtain said acylamino compound free from impurities and in high yield.

2. Process in accordance with claim 1 where the lower alkanol is selected from the group consisting of methyl alkanol, ethyl alkanol, propyl alkanol and butyl alkanol.

3. Process for the production of acylated sarcosine in high yield and in pure form, which comprises reacting sarcosine with oleic acid chloride in the presence of sodium hydroxide in dilute solution at a pH above 9.5 and at a temperature below about 50° C. whereby there is formed acylated sarcosine and, as contaminants, sodium oleate, sodium chloride, unreacted sarcosine and minor amounts of other by-products, and at the completion of the reaction adding to the reaction mixture from 5% to 50% by weight of a water-soluble lower alkanol and lowering the pH of the reaction mixture so as to cause the said contaminants promptly to precipitate out in excellent filterable condition and the acylated sarcosine to go into solution in aqueous lower alkanol, and then distilling off the alkanol and water from said aqueous solution of acylated sarcosine to obtain said acylated sarcosine free from impurities and in high yield.

4. Process in accordance with claim 3 where the lower alkanol is selected from the group consisting of methyl alkanol, ethyl alkanol, propyl alkanol and butyl alkanol.

References Cited in the file of this patent

UNITED STATES PATENTS 2,411,434     Katzman _____ Nov. 19, 1946

OTHER REFERENCES

Hackh: Chemical Dictionary (1944 edition), page 18, The Blakiston Company, Philadelphia.